United States Patent [19]

Cannon

[11] 4,150,328

[45] Apr. 17, 1979

[54] APPARATUS AND METHOD FOR CONTROLLING A MACHINE TOOL ALONG A CIRCULAR PATH

[75] Inventor: Lee E. Cannon, Bozeman, Mont.

[73] Assignee: Dana Corporation, Toledo, Ohio

[21] Appl. No.: 833,087

[22] Filed: Sep. 14, 1977

[51] Int. Cl.² ............................................. G05B 19/22
[52] U.S. Cl. ................................... 318/573; 318/603; 364/107
[58] Field of Search ....................... 318/603, 573, 574; 364/107

[56] References Cited

U.S. PATENT DOCUMENTS

| | | | |
|---|---|---|---|
| 3,069,608 | 12/1962 | Forrester et al. | 318/603 X |
| 3,783,253 | 1/1974 | Anderson et al. | 318/573 X |
| 3,878,983 | 4/1975 | Hamill | 318/574 |
| 4,054,822 | 10/1977 | Steinberg et al. | 318/573 |
| 4,079,235 | 3/1978 | Froyd et al. | 318/573 X |

*Primary Examiner*—B. Dobeck
*Attorney, Agent, or Firm*—Wilson, Fraser & Clemens

[57] ABSTRACT

In a control apparatus for a machine tool, an interpolator circuit for determining whether or not one of the axis motors should be inhibited on the next step to maintain the tool closer to the desired circular path. The interpolator utilizes information as to the distance from the initial position of the tool to the center of the arc defining the path of travel and which axis is to be inhibited initially to determine when to inhibit. The main logic circuit in the control apparatus begins a move of the number of steps equal to the distance to be moved along the axis which represents the shorter distance between the initial point and the center of the arc. The interpolator presets a counter with that number of steps subtracted from the number of steps equal to the distance to be moved along the other axis and increments that counter by one each time the selected motor is inhibited. At the octant point, the main logic circuit adds the counter total to the number of steps yet to be moved and continues the move while the counter total is converted to its negative and the counter is incremented by one for each time the other motor is inhibited. When the main logic circuit determines that the all of the steps have been moved, the counter total represents any correction to be made.

24 Claims, 4 Drawing Figures

FIG. 3 ical control apparatus along a circular path in particular.

APPARATUS AND METHOD FOR CONTROLLING A MACHINE TOOL ALONG A CIRCULAR PATH

CROSS REFERENCE TO RELATED APPLICATION

The disclosures in copending patent application Ser. No. 731,867 filed Oct. 13, 1976 in the name of the inventor hereof and commonly assigned herewith are incorporated by reference.

BACKGROUND OF THE INVENTION

1. Field Of The Invention

The present invention relates to numerical control systems for driving motors in general and to a system for controlling a machine tool along a circular path in particular.

2. Description Of The Prior Art

Stepping motors have long been used to provide extremely accurate speed and position control. In many applications it is desirable to drive two or more stepping motors simultaneously. There are two general methods to accomplish this. One method is to drive each stepping motor separately and control each at the desired rate. An example of such system is shown in U.S. Pat. No. 3,069,608. Alternatively, the motors can be driven by the same controls at the same rates. When applied to a system wherein the two motors are driving a tool respectively along two axes at right angles to one another, for instance an X-Y table, this allows a single step to be taken along either axis or a 45° step to be taken when motors are simultaneously stepped.

The referenced application Ser. No. 731,867 discloses a control circuit for two stepping motors which control circuit includes a microprocessor and two counters to control the constant velocity and acceleration of the motors. If it is desired to make a circular move in an octant or a linear move along a slope other than 45°, the main logic attempts to drive the tool along both axes a distance equal to the longer distance to be moved and an interpolator is utilized which is responsive to each motor pulse for determining whether less error (from the slope for linear moves and from the radius for circular moves) would result from a simultaneous move or from inhibiting one of the motors on the next pulse. Such operation will result in a linear move following the proper slope and ending at the desired point or a circular move following the predetermined radius with the tool at the proper distance along the axis of the longer move while a correction move may be required along the axis of the shorter move. This correction is determined by presetting a counter to the number of steps representing the shorter move minus the number of steps representing the longer move and then incrementing the counter by one for each non-simultaneous move. The counter total after the longer distance has been moved then represents the correction to be made if any.

Although it is desirable to be able to make a move between any two points both in an octant and a quadrant, the above method is not entirely suitable. Each step requires two calculations of the square root of the sum of the squares type the results of which must be compared with the radius of the arc. Such calculations are costly in terms of the circuitry required to implement them and in the time required to do them (such time being detrimental to performance in the form of dwell marks on the work). Thus, a control circuit utilizing a microprocessor in the main logic circuit is limited as to the types of moves and the speed with which they can be made.

SUMMARY OF THE INVENTION

The present invention concerns an interpolator circuit for controlling a numerical control apparatus along a circular path. A microprocessor in the main logic circuit is interfaced with a microprocessor in the interpolator circuit to provide data as to the distance between the present or initial position of the machine tool and the location of the center of the arc. The main logic starts a move of the number of steps equal to the distance to be moved along the axis which represents the shorter distance between the starting point and the center of the arc. A counter in the interpolator is then preset with the above defined number of steps subtracted from the number of steps equal to the distance to be moved along the other axis. After each step, the interpolator determines whether less error would result from a simultaneous move or a move wherein the motor controlling movement along the axis of the shorter distance to be moved is inhibited by checking the sign of a parameter representing the sum of the errors resulting from the previous moves. This parameter is updated after each move. If the motor is inhibited, the counter total is incremented by one count.

The interpolator also maintains a parameter which changes sign at the octant change point since, when the tool arrives at that point, the other motor must occasionally be inhibited while the first inhibited motor is run continuously. At the octant point, the main logic circuit adds the counter total to the number of steps yet to be moved and begins this move. The counter total is then converted to its negative and the counter total is incremented by one for each time the other motor is now inhibited. When the main logic circuit determines that all of the steps have been moved, the counter total represents any correction to be made in the last axis that could have been inhibited.

It is an object of the present invention to control motors driving a machine tool over a circular path in a simple, accurate and highly hardware efficient manner.

It is another object of the present invention to increase the speed with which a machine tool can be controlled over a circular path by a microprocessor based motor control.

DESCRIPTION OF THE PREFERRED EMBODIMENT

Figure 1:
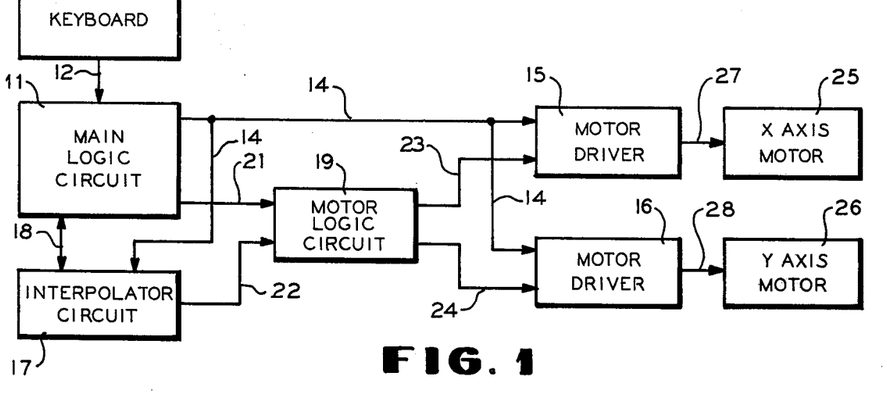
FIG. 1 is a block diagram of a machine tool control system incorporating the present invention.

Referring to FIG. 1, there is shown a block diagram of a two axes machine control system including an interpolator circuit according to the present invention. This system can be utilized to accurately control a machine tool along an operator selected path. The selected path and other command instructions are applied in a main logic circuit 11 on a line 12 via a data input means such as a keyboard 13. The main logic circuit generates a pulse train on a line 14 which is an input to an X axis motor driver 15 and a Y axis motor driver 16. The pulses on the line 14 are also applied to an interpolator circuit 17 which is connected to the main logic circuit by a line 18.

A motor logic circuit 19 receives control signals from the main logic circuit 11 on a line 21 and also from the interpolator circuit on a line 22 and generates control signals to the motor drivers 15 and 16 on a pair of lines 23 and 24 respectively. The motor drivers 15 and 16 are connected to an axis driving motor 25 by a line 27 and to a Y axis driving motor 26 by a line 28 respectively. Although the present invention can also be implemented with a three axes machine control system, this description will be limited to the discussion of a two axes system to simplify the description. Furthermore, although the motors 25 and 26 are typically stepping motors, many types of AC and DC motors can be used.

A detailed description of the main logic circuit 11 is disclosed in U.S. Patent application Ser. No. 731,867 entitled "Stepping Motor Control Circuit" which is incorporated herein by reference. The main logic circuit 11 includes a means for accelerating and decelerating the machine tool by varying the rate of the pulse train on the line 14. The main logic circuit also includes a microprocessor which is utilized to generate axes and direction control signals to the motor logic circuit 19. As will be discussed, the interpolator circuit functions to generate control signals to the motor logic circuit 19 which signals are utilized to direct movement of the machine tool in either a linear path or a circular path having a selected radius.

The motor logic circuit 19 is utilized to signal the motor drivers when the respective motors are to be stepped. The motor logic circuit also provides the motors drivers with control signals which determine the direction in which the motors are to be stepped. The motor drivers 15 and 16 provide polarity changes to the windings of the motors 25 and 26 in accordance with the axis and direction commands from the motor logic circuit. Typically, the motor drivers include means to scale the input pulses to generate a motor increment for each one, two, five or ten control pulses. This provides compensation for various mechanical systems while programming the controller simply in movement distances such as thousandths of an inch.

Figure 2:
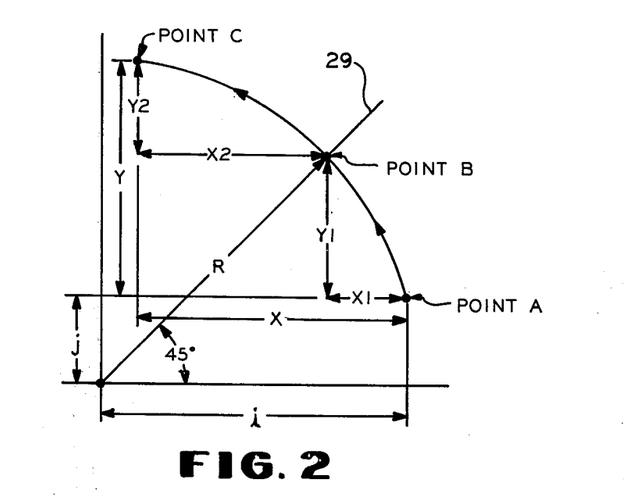
FIG. 2 is a plot of a circular move between two points on a work surface.

Before discussing the circuitry of the preferred embodiment of the present invention, the general operation of the invention will be discussed. There is shown in FIG. 2 a plot which will be utilized in conjunction with FIG. 1 to describe this operation. The present invention provides control of the machine tool along a curvilinear path between two points. Referring to FIG. 2, assume that a machine tool is initially positioned at point A and an operator desires to move the tool to point C along an arc which is a portion of a circle having a radius R. The operator provides the main logic circuit 11 with the necessary move information via a keyboard 13. Since the main logic circuit knows the present position of the tool, this move information includes the distances to the center of the arc, the distances to be moved to the final point C, which axis to initially inhibit and the rate at which the motors are to be pulsed. The main logic circuit 11 then supplies the interpolator circuit 17 with the information as to the distances to the center of the arc and which axis to initially inhibit on the line 18. As will be discussed, the interpolator circuit utilizes a microprocessor which facilitates the transfer of data between the circuits 11 and 17.

Before the move is begun, the interpolator must perform some initial calculations. The circuit 17 signals the main logic circuit 11 to pause until the initial parameters of the move have been calculated. The interpolator has received the information indicating that "i" is the distance between the starting point A and the center of the arc along the X axis and that "j" is the corresponding distance along the Y axis. The interpolator calculates an initial value for a parameter designated as a sum of the errors parameter F equal to four times the "j" value minus two times the "i" value plus three. Thus, the sign of the initial value of the sum of the errors parameter F will be positive if the starting point A is between 0° and approximately 30° in the first octant of FIG. 2 and is negative between approximately 30° and the octant change point B at 45°. The sign of the value of the sum of the errors parameter F initiates the type of move to be made to minimize the error between the desired path of travel and the actual path of travel. In the first octant, a positive sign indicates a simultaneous move of the motors and a negative sign indicates a move along the Y axis only, the distance Y1 always exceeding the distance X1. Since an initial linear move will generate less error between 0° and 30° and a simultaneous move will generate less error between 30° and 45°, the sign of the initial value of the sum of the errors parameter F assures that these moves will be made.

The interpolator also calculates the values of four other parameters. A first octant linear move error parameter P1 has an initial value equal to four times "j" plus two, a second octant linear move error parameter P2 has an initial value equal to two minus four times "i", an octant change correction parameter C has an initial value equal to two times the sum of "i" and "j" and a simultaneous move error parameter Q has an initial value equal to four times "j" minus four times "i" plus two.

As was previously stated, during movement in the first octant, a negative value of the parameter F indicates that a linear move is to be made along the inhibited axis, the Y axis, and a positive value indicates that a simultaneous move is to be made to minimize the error. After each move, the values of the parameters are updated. For a linear move, four is added to the value of the parameters Q and P1, two is added to the value of the parameter C and the new value of the parameter P1 is added to the value of the parameter F. For a simultaneous move, eight is added to the value of the parameter Q, four is added to the values of the parameters P1 and P2 and the new value of the parameter Q is added to the value of the parameter F. Thus, the value of the parameter P1 is proportional to the distance between the center of the arc and the present location of the machine tool along the Y axis, the value of the parameter P2 is proportional to the distance between the center of the arc and the present location of the machine tool along the X axis, the value of the parameter Q is proportional to the number of moves yet required of both motors to work the machine tool from its present location to the octant change point B and the value of the parameter C is proportional to a correction factor required to change the sign of the value of the parameter F at the octant change point.

When the sign of the value of the parameter Q changes, the last move has placed the machine tool in the second octant. Now a negative value of the parameter F indicates that a simultaneous move is to be made and a positive value indicates that a linear move is to be made along the X axis, the distance X2 always exceeding the distance Y2. The values of the parameters P1 and C are no longer updated while the numbers added to the values of the other parameters for a simultaneous move remain the same. For a linear move, four is added to the values of the parameters Q an P2 and the new value of the parameter Q is added to the value of the parameter F. Before the first move in the second octant, the value of the parameter C is subtracted from the value of the parameter F before the last move was made to generate a new value having the opposite sign to assure correct movement in the second octant.

After the initial values have been calculated for the five parameters, the main logic presets a pulse counter with a count total equal to the distance to be moved along the Y axis to assure that the octant change point B will be reached. The count total of the pulse counter is decremented for each simultaneous and linear move. The interpolator presets a non-simultaneous counter with a count total equal to the distance to be moved along the initially inhibited axis, the X axis, minus the distance to be moved along the other axis, the Y axis. Thus, for the move from point A to point C, the non-simultaneous counter would be preset to (X-Y).

After the initial parameters have been calculated and the counters preset, the interpolator 17 signals the main logic circuit 11 that the move can begin. The main logic circuit begins to apply pulses on the line 14 to the motor drivers 15 and 16. The interpolator then functions to control the move of the tool from point A to point B along the arc by occasionally inhibiting movement in the X direction. The interpolator will determine whether or not to inhibit the X axis motor by checking the sign of the sum of the errors parameter. If the interpolator determines that movement in the X direction should be inhibited, it generates a signal on the line 22 to the motor logic circuit 19. The motor logic circuit then applies a signal on the line 23 to the motor driver 15 which disables the motor driver and prevents the pulse on the line 14 from being applied to the X axis motor 25.

In addition to generating an X axis motor disable signal, the interpolator 17 increments the previously mentioned nonsimultaneous counter total by one count. When the tool is travelling from point A to point B, the non-simultaneous counter total will be incremented each time a move in the X direction has been inhibited. As shown in FIG. 2, the distances "X1" and "Y1" are the distances the tool must travel in moving from point A to point B. Therefore, the X axis motor will be inhibited (Y1-X1) times. Thus, when the tool reaches point B, the non-simultaneous counter total will be equal to its preset value (X-Y) plus the number of times the X axis motor has been inhibited (Y1-X1) or (X-Y) + (Y1-X1).

When the tool reaches point B, the interpolator circuit signals the main logic circuit that an octant change has occurred. The main logic circuit will add the non-simultaneous counter total to the pulse counter total and then load the non-simultaneous counter with the negative of its current value. Now the nonsimultaneous counter count total is equal to (Y-X) + (X1-Y1). Also, the interpolator designates the X axis as the axis to be inhibited and the Y axis as the axis which is to continuously receive pulses. The pulse counter total which was (Y-Y1) at the octant change point is now (X-X1) which equals X2, the longer distance yet to be moved.

The interpolator now functions to control the movement of the tool from point B to point C along the arc by occasionally inhibiting the movement in the Y direction. If the interpolator determines that movement in the Y direction should be inhibited, it generates a signal on the line 22 to the motor logic circuit 19. The motor logic circuit responds applying a signal on the line 24 to the motor driver 16 which disables the motor driver 28 and prevents the pulse on the line 14 from being applied to the Y axis motor 26.

When the tool is travelling from point B to point C, the non-simultaneous counter will be incremented each time a move in the Y direction has been inhibited. The distances X2 and Y2 correspond to the distances the tool must travel in moving from point B to point C. Thus, when the tool reaches point C, the non-simultaneous counter total will be equal to its value at point B, (Y-X) + (X1-Y1), plus the number of times the Y axis motor has been inhibited, (X2-Y2).

When the tool reaches point C, the move is completed except for a correction which may be necessary along the Y axis. At this time the non-simultaneous counter total is equal to (Y-X) + (X1-Y1) + (X2-Y2). If this total is equal to zero, no correction is necessary. However, if the counter total is negative, pulses must be applied to the X axis motor. Each pulse increments the main counter total by one and when the counter total equals zero, the move is completed.

If it is desired to move the tool along a linear path, the operator provides the main logic circuit 11 with the distances to be moved along each axis, which axis to inhibit and the rate at which the motors are to be pulsed. The initial calculations which must be performed by the interpolator are simpler than those required for a curvilinear move since there are no problems associated with an octant change. The interpolator sets a sum of the errors parameter equal to the distance that the tool must move along the longer axis. The distance which is longer becomes the axis whose motor will continuously receive pulses, while the motor of the other axis will occasionally be inhibited. Next, the interpolator calculates two error parameters, one for a simultaneous move equal to twice the shorter distance minus twice the longer distance and having a negative sign and one for a nonsimultaneous move equal to twice the shorter distance and having a positive sign. The pulse counter in the main logic is then preset to the longer distance.

When the move has begun, the interpolator will determine when to inhibit the axis motor corresponding to the shorter distance. This is done by checking the sign of the sum of the errors parameter. If the sign is positive, a simultaneous move is signaled to the main logic and the simultaneous move error parameter is added to the sum of the errors parameter. If the sign is negative, a non-simultaneous move is signaled to the main logic and the non-simultaneous move error is added to the sum of the errors parameter. After each move, the pulse counter total is decremented by one and, when the total reaches zero, the move is finished. No correction is required for a linear move.

Figure 3:
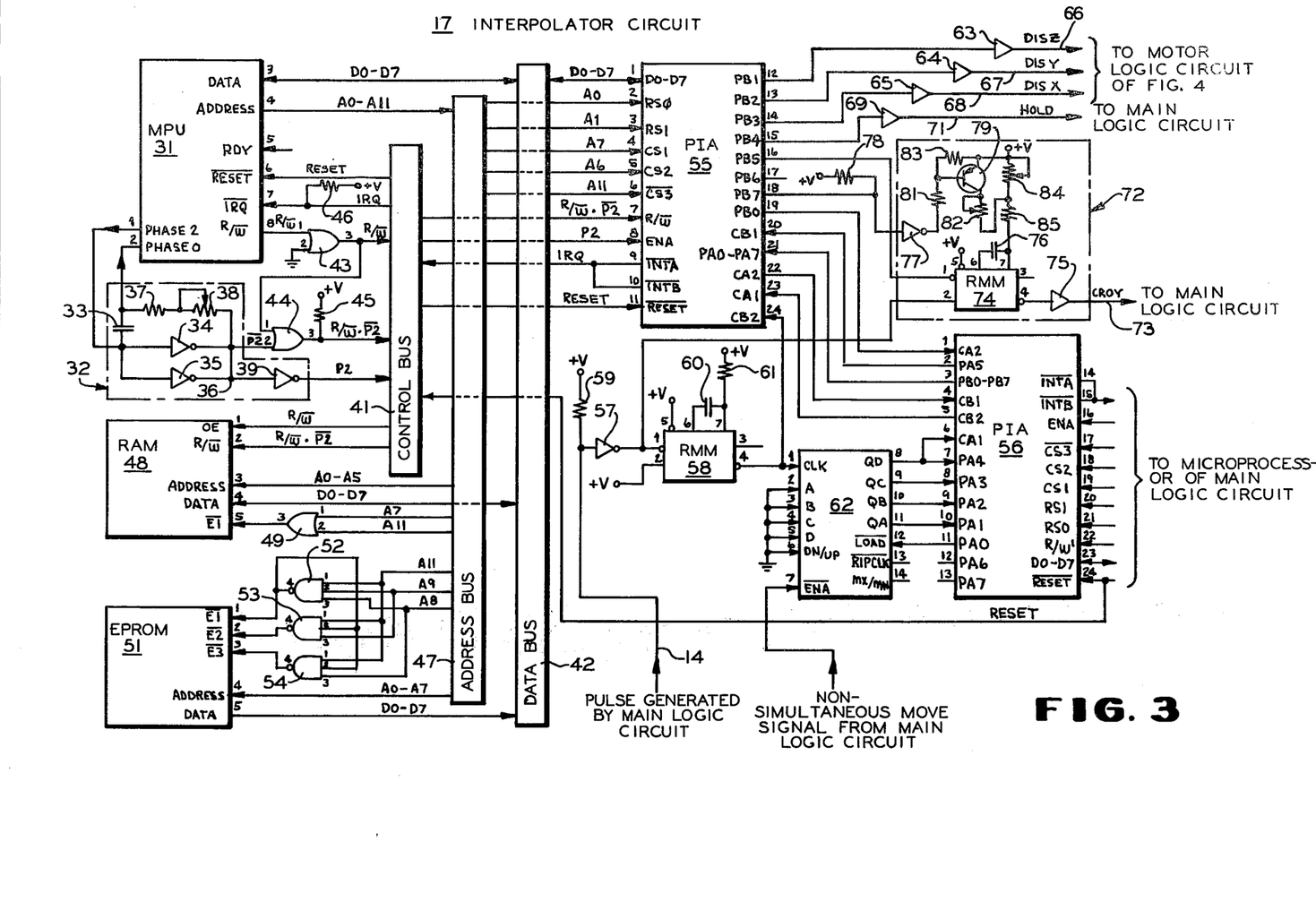
FIG. 3 is a schematic diagram of the interpolator of FIG. 1.

Referring to FIG. 3, there is shown a more detailed block diagram of the interpolator circuit 17 of FIG. 1. In FIG. 3 each circuit element having more than two terminals will have those terminals designated by the element reference numeral and a terminal number separated by a hyphen such as an input terminal 31-1 of a microprocessor (MPU) 31. Throughout this description, a negative or low logic level will be represented by a "0" and a positive or high logic level will be represented by a "1". A "0" signal corresponds to a voltage at or near ground potential and a "1" signal corresponds to a voltage at or near a positive V potential.

The microprocessor is a model MCS6505 manufactured by MOS Technology, Inc., 950 Rittenhouse Road, Norristown, Pa., 19401. The MPU 31 features an eight bit parallel data bus and a twelve bit parallel address bus. There are six internal registers for the temporary storage of data which include an accumulator, two index registers, a program counter, a stack pointer and a status register. The MPU 31 also features on-chip clock logic as will be discussed.

The clock logic which is internal to the MPU operates with an external RC circuit or a crystal to generate a clock pulse train for the interpolator circuits. There is generated at a PHASE 2 output 31-1 a clock signal which is applied to an RC timing network 32 which functions to generate a system clock pulse train signal P2. A capacitor 33 is connected between the output 31-1 and a PHASE 0 input 31-2. A pair of parallel connected inverters 34 and 35 have inputs connected to the output 31-1 and outputs connected to a common junction 36. Although parallel connected inverters are shown, a single inverter can be utilized. A resistor 37 is connected in series with a potentiometer 38 between the input 31-2 and the common junction 36. The junction 36 is also connected to the input of an inverter 39 having an output which is connected to a control bus 41.

If we assume that a "0" is generated at the output 31-1, the "0" will be changed to a "1" by the inverters 34 and 35 at the junction 36. Since the voltage across a capacitor cannot change instantaneously, the capacitor 33 will charge through the resistor 37 and the potentiometer 38. When the capacitor becomes charged to the "1" voltage level, this "1" is sensed at the input 31-2 and the internal clock logic changes the signal at the output 31-1 to "1". The inverters 34 and 35 change this "1" to a "0" at the junction 36 and now the capacitor 33 must discharge to "0" at the input 31-2. This operation will continue thereby generating a pulse train of alternate "0" and "1" pulses at the junction 36. The frequency of this pulse train is determined by the RC time constant defined by the values of the capacitor 33, the resistor 37 and the potentiometer 38 and can be changed by adjusting the potentiometer. A typical pulse train frequency is 500 kHz. The inverters 34 and 35 are connected in parallel to drive the following circuits at a definable logic level.

A read/write (R/$\overline{W}$) output 31-8 is connected to an input 43-1 of an OR 43 and is utilized to signal peripheral devices as to whether the MPU 31 is reading data from or writing data onto a data bus 42. An input 43-2 is connected to the system ground potential such that the OR 43 functions as a buffer to increase the drive available to the following circuits. A "0" at the output 31-8 remains a "0" at an output 43-3 which is connected to the control bus 41. The "0" at this output indicates that the MPU 31 is reading data from the data bus and a "1" indicates that the MPU is outputting data to the data bus. The output 43-3 is also connected to an input 44-1 of an OR 44 having an output 44-3 which is connected to the control bus 41. A resistor 45 is connected between a positive polarity power supply (not shown) and the output 44-3 to maintain a "1" signal when many following circuits must be driven. A second input 44-2 is connected to the junction 36 to receive a clock signal $\overline{P2}$, which is the P2 clock signal before it is inverted by the inverters 34 and 35. The OR 44 functions to generate a control signal R/$\overline{W}$.$\overline{P2}$ which is utilized to control the transfer of data to and from the interpolator circuit. The control signal R/$\overline{W}$.$\overline{P2}$ will be at "1" only when the R/$\overline{W}$ and $\overline{P2}$ signals are both at "1" and will be at "0" for any other combination of these signals.

Other inputs to the MPU 31 include an interrupt request ($\overline{IRQ}$) input 31-7, a $\overline{RESET}$ input 31-6 and a ready (RDY) input 31-5. The $\overline{IRQ}$ input 31-7 is connected to the control bus 41 and to the positive polarity power supply (not shown) through a resistor 46. The IRQ interrupt request signal is normally maintained at "1" by the power supply. However, when a peripheral device requests an interrupt, the IRQ signal goes to "0". The microprocessor responds by completing the current instruction and then performing an interrupt sequence. The $\overline{RESET}$ input 31-6 is connected to the control bus 41 and receives a RESET signal which is normally at "1". This input is utilized to reset and start the microprocessor from a power down condition resulting from a power failure or an initial start-up of the processor. If a "0" to "1" transistion is detected at the input 31-6 the microprocessor will begin the restart sequence which will execute a routine to initialize the microprocessor from its reset condition. The RDY input 31-5 normally receives a control input signal which is utilized to temporarily inhibit the execution of instructions by the microprocessor. However, this feature is not utilized in the circuit of FIG. 3 and therefore the input 31-5 is not connected.

A group of eight data terminals 31-3 are connected to eight parallel lines (not shown) which comprise the data bus 42. These terminals are bidirectional for transferring data to and from the memory and peripheral devices. A group of twelve address terminals 31-4 are connected to twelve parallel lines (not shown) which comprise an address bus 47. The twelve address signals provide the capacity to address a total memory space of 4096 bytes.

A RAM 48 is a read/write memory organized into 64 eight bit words which are directly addressable. The RAM 48 is utilized as a data memory to store intermediate results which are obtained during the execution of a program. A plurality of address inputs 48-3 are connected to the address bus 47 for receiving the A0 through A5 address signals generated by the microprocessor 31. The address signals represent 64 different binary coded six bit addresses, one for each word in memory. An enable ($\overline{E1}$) input 48-5 is connected to the output 49-3 of an OR gate 49 and is utilized to enable the RAM 48. The inputs 49-1 and 49-2 of the OR 49 are connected to the address bus to receive the A7 and A11 address signals respectively. The $\overline{E1}$ input must be at "0" if data is to be read from or written into the RAM 48. Therefore, only when the A7 and A11 address signals are both at "0" will the RAM 48 be enabled.

A plurality of bidirectional data terminals 48-4 are connected to the data bus 42 and are utilized to transfer data into and out of the RAM 48. The (OE) input 48-1 and the read write (R/$\overline{W}$) input 48-2 are utilized to control whether the RAM 48 is inputting data or outputting data on the data bus 42. Both the OE input 48-1 and the R/$\overline{W}$ input 48-2 are connected to the control bus 41 to receive the $\overline{R/W}$ and the R/$\overline{W}$.$\overline{P2}$ signals respectively. When the R/$\overline{W}$.$\overline{P2}$ signal is at "1" and the $\overline{E1}$ input 48-5 is at "0", the $\overline{R/W}$ signal will be at "0" and the RAM 48 will output the data which is stored in the location specified by the address inputs 48-3. However, when the R/$\overline{W}$.$\overline{P2}$ signal and the $\overline{E1}$ input are both "0", the $\overline{R/W}$ signal will be at "1" and the RAM 48 will store the data which is on the data bus in the addressed location.

An EPROM 51 is a an erasable and electrically reprogrammable read only memoray (EPROM) organized into 256 eight bit words which are directly addressable. The EPROM 51 is representative of a plurality of such devices (not shown) which are utilized to store program instructions and data necessary for the operation of the interpolator circuit. A plurality of address inputs 51-4 are connected to the address bus 47 for receiving the A0 through A7 address signals generated by the microprocessor. The address signals represent 256 different binary coded eight bit addresses, one for each word in memory.

The enable inputs $\overline{E1}$ 51-1, $\overline{E2}$ 51-2, and $\overline{E3}$ 51-3 are connected to the outputs 52-4, 53-4, and 54-4 of the NAND gates 52, 53, and 54 respectively. These inputs are utilized to individually select the various ROMs. Thus, with the three bit enable word, up to eight ROMs can be individually enabled. The NAND 52 has an input 52-1 connected to the address bus for receiving the A11 address signal, an input 52-2 connected for receiving the A9 address signal and an input 52-3 connected for receiving the A8 address signal. The NAND 53 has an input 53-1 connected to the address bus for receiving the A11 address signal, an input 53-3 connected for receiving the A9 address signal and an input 53-2 connected to the output 52-4 of the NAND 52. The NAND 54 also has an input 54-1 connected to the address bus for receiving the A11 address signal, an input 54-3 connected for receiving the A8 address signal and an input 54-2 connected to the output 52-4 of the NAND 52. Hence, the NANDS 52, 53 and 54 receive control signals from the address bus 47 and generate output signals which are utilized to individually select various EPROMs.

When the EPROM 51 is addressed and enabled, the word selected by the address is outputted. The ROM 51 has eight data outputs 51-5 which are connected to the data bus 42. The stored word is generated onto the data bus as the D0 through D7 data signals. When the EPROM 51 is not enabled, the data outputs are in the off or high impedance state which is not a definable logic level.

Also connected to the address bus 47, the data bus 42 and the control bus 41 is an interface circuit 55. The interface 55 is a model MC6820 peripheral interface adapter (PIA) which provides the means for interfacing peripheral devices with the microprocessor 31. The interface has two sets of bidirectional lines for connection to peripheral devices with the capability of controlling each set independently and eight bidirectional data input/output terminals for communication with the microprocessor 31.

The interface 55 includes a pair of register select inputs (RS0 and RS1) which are utilized in conjunction with internal control registers to select a particular internal register that is to be written into or read from. The input (RS0) 55-2 is connected to the address bus 47 to receive the A0 address signal and the input (RS1) 55-3 is connected to receive the A1 address signal. A chip select input (CS1) 55-4 is connected to the address bus 47 to receive the A7 address signal, a chip select input (CS2) 55-5 is connected to receive the A6 address signal and a chip select input ($\overline{CS3}$) 55-6 connected to receive the A11 address signal. When the A7 and A6 address signals are at "1" and the A11 address signal is at "0" the interface 55 is selected for data transfer under the control of enable and read/write signals from the microprocessor 31.

A group of eight bidirectional data terminals 55-1 are connected to the data bus 42. These terminals allow the transfer of data signals D0 through D7 between the microprocessor 31 and the interface 55. These terminals are maintained in the high impedance state except when the microprocessor performs a read operation by generating a $R/\overline{W}.P2 = $ "1" signal. An enable input (ENA) 55-8 is connected to the control bus 41 to receive the P2 system clock signal from the clock logic circuit 32. The trailing edge of "1" pulses synchronizes all logic and timing within the interface.

A reset input ($\overline{RESET}$) 55-11 is connected to the control bus 41 to receive the RESET signal. When $\overline{RESET}$ = "0", all register bits in the interface 55 are set to "0". A read/write input ($R/\overline{W}$) 55-7 is connected to the control bus 41 to receive the $R/\overline{W}.P2$ signal. When $R/\overline{W}.P2$ = "0", the interface input buffers are enabled and data can be transferred from the microprocessor 31 to the interface 55 on the data bus 42 when the interface has been selected and the enable signal has been generated. When $R/\overline{W}.P2$ = "1", the interface output buffers are enabled and data can be transferred from the interface to the microprocessor when the interface has been selected and the enable signal has been generated.

A pair of interrupt request outputs ($\overline{INTA}$ and $\overline{INTB}$) are connected together to the control bus 41 to generate an IRQ interrupt request signal to the microprocessor 31. The $\overline{INTA}$ output 55-9 and the $\overline{INTB}$ 55-10 each have two internal flag bits associated therewith which when set will generate an IRQ = "0" signals. Each flag bit is also associated with a separate peripheral interrupt line so that any one of four peripheral devices can generate an interrupt reguest signal. The interrupt request signal is serviced by a microprocessor routine which sequentially reads and tests on a prioritized basis the interface for the interrupt flag bits that are set. The flag bits are set to "0" when the microprocessor reads the data from the interface.

A group of the terminals of the interface 55 are connected to an interface circuit 56 which is also a model MC6820 peripheral interface adapter (PIA). The interface 56 provides the means for the transfer of data and control signals from the main logic circuit to the microprocessor 31 through the interface 55.

The interface 56 includes a pair of register select inputs RS0 56-21 and RS1 56-20 which are connected to receive the appropriate address signals from the address lines of the microprocessor of the main logic circuit. The chip select inputs CS1 56-19, CS2 56-18 and $\overline{CS3}$ 56-17 are also connected to receive the appropriate address signals from the main microprocessor.

A group of eight bidirectional data terminals (D0-D7) 56-23 are connected to the data bus of the main logic circuit. An enable (ENA) input 56-16 is connected to the main microprocessor to receive a system clock signal from the main logic circuit. A read/write ($R/\overline{W}$) input 56-22 is connected to receive the read/write control signal from the main microprocessor. A reset ($\overline{RESET}$) input 56-24 is connected to the main microprocessor and the control bus 41 to receive a RESET control signal. A pair of interrupt request outputs 56-14 and 56-15 are connected together to generate an interrupt request signal to the main microprocessor.

The interface circuits 55 and 56 each also include a group of eight section A data terminals (PA0-PA7) and a group of eight section B data terminals (PB0-PB7). Each of the data terminals can be programmed to function as an input or an output by setting an internal data direction register bit equal to "1" for an output and equal to "0" for an input. In interface circuit 55, all the (PA0-PA7) terminals 55-21 are programmed as inputs. During a read operation of the microprocessor 31, data on the terminals 55-21 appears on the corresponding data bus lines connected to the data terminals 55-1. All of the (PB0-PB7) terminals 55-12 through 55-19 of the interface 55 are programmed as outputs. The microprocessor 31 writes data into a B output register in the interface 55 which data will appear at the corresponding PB0-PB7 terminals as control signals to the associated peripheral devices. In the interface circuit 56, all of the section B data terminals (PB0-PB7) 56-3 are programmed as outputs and are connected to the PA0-PA7 terminals 55-21. However, the section A data terminals of the interface 56 are programmed as both inputs and outputs as will be discussed.

The interface circuits 55 and 56 each have four control signal terminals for controlling external logic. A pair of interrupt inputs CA1 55-23 and 56-6 and a pair of peripheral control terminals CA2 55-22 and 56-1 are associated with the control of the section A terminals PA0-PA7. The input CA1 is used by peripheral devices to request an interrupt. This input can be programmed to set an associated interrupt flag bit on either a "1" to "0" transition or a "0" transition. The CA2 terminal is bidirectional and can function as an interrupt input or a peripheral device control signal. A pair of interrupt inputs CB1 55-2 and 56-5 and a pair of peripheral control terminals CB2 55-24 and 56-5 function in a manner similar to the terminals CA1 and CA2 except that CB1 and CB2 are associated with the control of the section B terminals. PB0-PB7.

As stated above, the PA0-PA7 input terminals 55-21 of the interface 55 are connected to the PB0-PB7 output terminals 56-3 of the interface 56. These connections are utilized to transfer data from the main logic circuit to the microprocessor 31. The CA1 terminal 55-23 is connected to the CB2 terminal 56-5 and the CA2 terminal 55-22 is connected to the CB1 terminal 56-4. When there is no data to be transferred, the CA1 terminal 55-23 receives a "1" signal and the CB1 terminal 56-4 receives a "0" signal. When it is desired to transfer data, the main microprocessor will apply the appropriate chip and register select signals to inputs 56-17 through 56-21. Next, the main microprocessor will apply a "0" signal to the R/$\overline{\text{W}}$ input 56-22 to place the data which is on the D0-D7 terminals 56-23 onto the corresponding PB0-PB7 terminals 56-3. When the data has been written, the CB2 terminal 56-5 changes to "0". The "1" to "0" transition at the interrupt input CA1 55-23 generates an IRQ="0" at the $\overline{\text{INTA}}$ terminal 55-9 and causes a "1" signal to appear at the CA2 terminal 55-22. The IRQ="0" signal signals the microprocessor 31 that data is to be read from the PA0-PA7 terminals. The microprocessor applies a R/$\overline{\text{W}}$.P2 = "1" signal to the input R/W 55-7 which transfers the data on the PA0-PA7 terminals 55-21 to the corresponding D0-D7 terminals 55-1. When the data has been transferred, the CA2 terminal changes to "0". The "1" to "0" transition at the CB1 input 56-4 changes the CB2 terminal 56-5 to "1" and generates a "0" at the $\overline{\text{INTB}}$ terminal 56-15, which signals the main microprocessor that the interpolator is ready for another word of data.

The pulse train which is generated by the main logic circuit is applied to the motor drivers and the interpolator circuit on a line 14, as shown in FIG. 1. The line 14 is also connected to the input of an inverter 57 having an output connected to an input 58-1 of a retriggerable monostable multivibrator (RMM) 58. The input of the inverter 57 is also connected to a positive V power supply through a resistor 59 to provide a "1" signal when the pulse train is not being generated.

The RMM 58 functions to increase the duration of the inverted pulses which appear at the input 58-1. The RMM 58 has the low level active input 58-1, a high level active input 58-2, a non-inverting output 58-3 and an inverting output 58-4. Thus, a "1" at the input 58-1 and/or a "0" at the input 58-2 will generate a "0" at the output 58-3 and a "1" at the output 58-4. If the input 58-1 is held at "0" and a "0" to "1" transition occurs at the input 58-2 or the input 58-2 is held at "1" and a "1" to "0" transition occurs at the input 58-1, a "1" pulse and a "0" pulse will be generated at the outputs 58-3 and 58-4 respectively. The pulse width is determined by the values of a capacitor 60 connected between a pair of external timing inputs 58-6 and 58-7 and a resistor 61 connected between a positive polarity power supply (not shown) and the input 58-6. A "0" at the clear input 58-5 will reset the outputs 58-3 and 58-4 to "0" and "1" respectively but the clear function is not required in this circuit and therefore, the input 58-5 is disabled by connecting it to the positive polarity power supply (not shown).

The RMM 58 functions to increase the duration of the pulses which appear on the line 14. Since the input 58-2 is connected to the positive polarity power supply (not shown), a "1" to "0" transition at the input 58-1 will generate a "1" pulse and a "0" pulse at the outputs 58-3 and 58-4 respectively. The output 58-3 is not utilized in this circuit and therefore is not connected. The output 58-4 is connected to the CB2 input 55-24 and is utilized to signal the MPU 31 each time the main logic circuit generates a pulse on the line 14. The output 58-4 is also connected to a clock (CLK) input 62-1 of a synchronous up/down counter 62.

The counter 62 is a model SN74190 binary coded decimal (BCD) counter which features a down/up mode control. A group of data inputs A 62-2 through D 62-5 are utilized to initially preset the counter. The value of counter total appears at the counter outputs QD 62-8 through QA 62-11. The QA and QB outputs 62-11 and 62-10 are connected to the PA1 and PA2 terminals 56-10 and 56-9 respectively which are programmed as inputs. The QC and QD outputs 62-9 and 62-8 are connected to the PA3 and PA4 terminals 56-8 and 56-7 respectively which are also programmed as inputs. The QD output 62-8 is also connected to the CA1 input 56-6 as will be discussed.

A $\overline{\text{LOAD}}$ input 62-12 normally receives a "1" signal from the PA0 terminal 56-11 which is programmed as an output. When a "0" signal is applied to the $\overline{\text{LOAD}}$ input 62-12, the signals at the data inputs A through D will appear at the corresponding outputs QA through QD. Since the data inputs 62-2 through 62-5 are all connected to a ground potential source (not shown) to receive a "0" signal, a "0" signal at the $\overline{\text{LOAD}}$ input 62-12 will set all four counter outputs to "0". A down/up (DN/UP) input 62-6 is utilized to determine the direction of the count. The counter counts up or down when the input 62-6 is at "0" or at "1" respectively. In the circuit of FIG. 3, the counter 62 is utilized as an up counter and therefore the input 62-6 is connected to a ground reference to receive a "0" signal. An enable ($\overline{ENA}$) input 62-7 is utilized to enable and inhibit the counting. When the input 62-7 is at "0", the counter outputs will be incremented by one on each "0" to "1" transition at the clock input 62-1. A "1" signal at the input 62-7 will inhibit the counting.

The counter 62 includes two other output terminals. A ripple clock ($\overline{RIPCLK}$) output 62-13 generates a "0" pulse equal in width to the "0" portion of the signal at the clock input 62-1 when either an overflow or underflow condition exists. A maximum/minimum (MX/MN) count output 62-14 generates a "1" pulse with a duration approximately equal to one complete clock cycle of the clock input when the counter overflows or underflows. However, the outputs 62-13 and 62-14 are not utilized in the circuit and therefore are not connected.

The counter 62 is utilized by the main microprocessor to count each time either the X axis or the Y axis motor is inhibited. The counter 62 functions as the lower decimal digit of the previously mentioned non-simultaneous counter. The upper digits of the counter are stored in a memory location associated with the main microprocessor. The counter enable input 62-7 receives a non-simultaneous move signal on a line from the main logic circuit. The main logic circuit normally generates a "1" on this line which inhibits the counter 62. However, when a non-simultaneous move occurs, the main logic circuit generates a "0" pulse which appears at the $\overline{ENA}$ input 62-7. A non-simultaneous move occurs when either the X axis or the Y axis motor is inhibited. The counter 62 will then be incremented on the subsequent "0" to "1" transition at the CLK input 62-1. The duration of the "0" pulse at the input 62-7 is such that the counter will only be incremented once for each non-simultaneous move. As previously mentioned, the QD output 62-8 is connected to the CA1 input 56-6 of the interface 56 to receive a carry interrupt from the counter 62. The CA1 input 56-6 is programmed to generate a "0" signal at $\overline{INTA}$ output 56-14 when a "1" to "0" transition occurs at the output QD 62-8. This interrupt signals the main logic circuit to increment the upper digits of the main counter.

The PA5 terminal 56-2 is programmed as an output and is connected to the CB1 interrupt input 55-20. The main microprocessor generates an interrupt signal which is applied to the input 55-20. This interrupt signal is utilized to reset the interpolator microprocessor 31. The terminals PA6 56-12 and PA7 56-13 are not required in this circuit and therefore are not connected.

The PB0 through PB7 terminals of the interface 55 are programmed as outputs and are utilized to generate control signals to peripheral devices. The PB0 terminal 55-19 is connected to the CA2 terminal 56-1 which functions as an interrupt input for an octant change. When an octant change has occurred, the MPU 31 generates a signal at the PB0 terminal 55-19 which is inputted to the interface 56 at the input 56-1. The transition of the signal at the input 56-1 generates a "0" signal at the $\overline{INTA}$ output 56-14. This interrupt signals the main logic circuit to perform the previously discussed operation of converting the non-simultaneous counter to the negative of its current value and finalizing the total distance required.

The PB1 terminal 55-12, the PB2 terminal 55-13 and the PB3 terminal 55-14 are connected to the inputs of open collector buffers 63, 64 and 65 respectively. The PB1, PB2 and PB3 terminals are utilized to generate the disable signals DIS Z, DIS Y and DIS X on lines 66, 67 and 68 respectively which are connected to the motor logic circuit of FIG. 4. The motor logic circuit utilizes the disable signals to inhibit the respective axis stepping motor. The terminals PB1 55-12, PB2 55-13 and PB3 55-14 are normally at "0" and therefore the signals DIS Z, DIS Y and DIS X are also normally at "0". However, if the interpolator microprocessor has determined that for example, the X axis motor should be inhibited, it will generate a "1" at the PB3 terminal 55-14. The DIS X signal would then be changed to "1" and would be utilized by the motor logic circuit to inhibit the X axis motor.

The PB4 terminal 55-15 is connected to the input of an open collector buffer 69 and is utilized to generate a HOLD signal on a line 71 which is connected to the main logic circuit. The HOLD signal is utilized to inhibit the operations of the main logic circuit. The terminal 55-15 is normally at "0" and therefore the HOLD signal on the line 71 is normally at "0". However, if the interpolator microprocessor requires an additional amount of time to perform, for example, initial parameter calculations, it would generate a "1" at the PB4 terminal 55-15. The HOLD signal would then be at "1" and would inhibit the operations of the main logic circuit until the HOLD signal becomes "0".

The PB5 and PB7 terminals 55-16 and 55-18 generate control signals to a rate calibration circuit 72. The PB6 terminal 55-17 is not utilized in this circuit and therefore is not connected. The circuit 72 functions to generate a contouring ready (CRDY) signal on a line 73 which is connected to the main logic circuit. The CRDY signal is utilized by the main logic circuit to limit the rate at which pulses are applied to the line 14 of FIG. 1. The PB5 terminal 55-16 is connected to a low level active input 74-1 of a retriggerable monostable multivibrator (RMM) 74 which operates in a manner similar to the RMM 58. A high level active input 74-2 is connected to the output of the inverter 57 to receive an inverted form of the pulses on the line 14. The inverting output 74-4 is connected to the input of an open collector buffer 75. The CRDY signal appears at the output of the buffer 75 which is connected to the line 73. A noninverting output 74-3 is not utilized in this circuit and therefore is not connected. A clear input 74-5 is also not required in this circuit and is disabled by connecting it to the positive polarity power supply (not shown). The output pulse width of the CRDY signal is determined by the value of a capacitor 76 connected between a pair of external timing inputs 74-6 and 74-7 and the effective resistance connected between the positive polarity power supply (not shown) and the input 74-6. As will be discussed, the effective resistance depends on whether the machine tool is to move along a linear or a circular path.

The PB7 terminal 55-18 is connected to the input of an inverter 77 and to the positive polarity power supply (not shown) through a resistor 78. The output of the inverter 77 is connected to the base of a PNP transistor 79 through a resistor 81. The transistor 79 has a collector connected to a first potentiometer 82 and an emitter connected to the positive polarity power supply (not shown). A resistor 83 is connected between the base and emitter of the transistor 79. A second potentiometer 84 and a resistor 85 are connected between the emitter of transistor 79 and the external timing input 74-7 of the RMM 74.

If the machine tool is to move along a linear path, the interface 55 will generate a "0" signal at the PB7 terminal 55-18 and a "1" signal will appear at the output of the inverter 77. Since this "1" signal is at or near the positive polarity potential there will not be sufficient current flowing through either of the resistors 83 or 81 to turn on the transistor 29. Hence, the PNP transistor 79 will be in the off state and no current will flow through the potentiometer 82. Thus, the only current path for timing purposes is through the potentiometer 84 and the resistor 85. The potentiometer 84 must be adjusted to determine the pulse width of the CRDY signal required for a linear move.

If the machine tool is to move along a circular path, the interface 55 will generate a "1" signal at the PB7 terminal 55-18 and a "0" signal will appear at the output of the inverter 77. Since this "0" signal is at or near the system ground potential, the PNP transistor 79 will be in the on state and current will flow through the potentiometer 82. The potentiometer 82 must then be adjusted to determine the pulse width of the CRDY signal required for a circular move.

Figure 4:
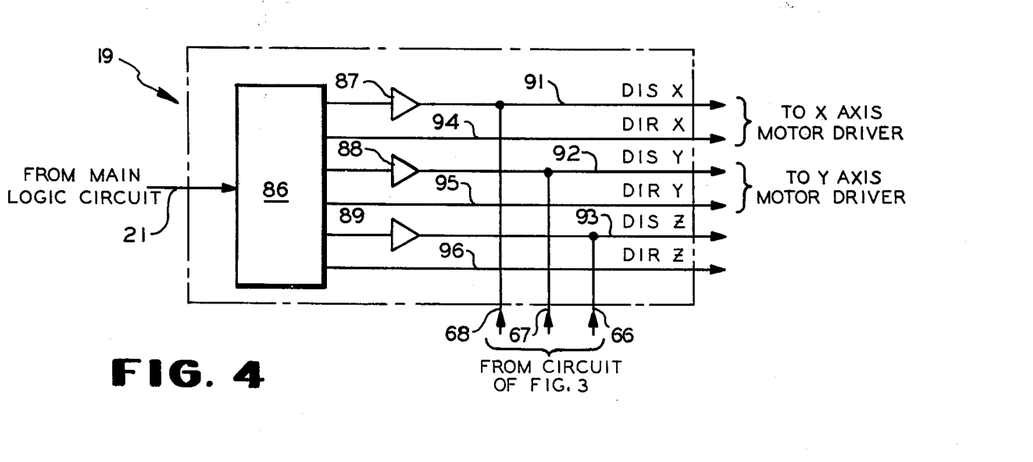
FIG. 4 is a schematic diagram of the motor logic circuit of FIG. 1.

There is shown in FIG. 4 a partial block, partial schematic diagram of the motor logic circuit 19 of FIG. 1. A decoder circuit 86 receives signals on the line 21 from the main logic circuit 11 which contain axes and direction commands for the motor drives. The line 21 is representative of a plurality of lines which can be connected between the motor logic circuit 19 and the main logic circuit 11. The circuit 19 decodes the signals received on the line 21 to generate the appropriate control signals to the motor drivers.

The decoder circuit 86 is connected to the input of open collector buffers 87, 88 and 89 to generate the disable control signals DIS X, DIS Y and DIS Z on the lines 91, 92 and 93 respectively. The circuit 86 generates the direction control signals DIR X, DIR Y and DIR Z on the lines 94, 95 and 96 respectively. The lines 91, 92 and 93 are connected to the lines 68, 67 and 66 to receive the disable control signals from the interpolator circuit of FIG. 3. The lines 91 and 94 are connected to the X axis motor driver 15 and the lines 92 and 95 are connected to the Y axis motor driver. The lines 93 and 96 are utilized to generate control signals to a Z axis motor driver in a three axes machine control system. However, since this is a description of a two axes system, the lines 93 and 96 are not connected.

The DIS X and DIS Y signals are utilized to disabled the motor drivers 15 and 16 of FIG. 1 to prevent the pulse on the line 14 from being applied to the respective motor which it is desired to disable. When either DIS X or DIS Y is at "0", the corresponding motor driver will be disabled. Thus, the motor connected to the disabled motor driver will not be stepped. The DIR X and DIR Y signals are utilized by the motor drivers to control the direction in which the motors are to be stepped. A "0" representing one direction of rotation and a "1" the opposite direction.

In summary, the present invention concerns a method and an apparatus for controlling a machine tool along a predetermined circular path defining an arc. The method involves controlling a pair of motors such as stepping motors for driving an object such as a machine tool along the path defined by a starting point in one octant and a finishing point in an adjacent octant in incremental moves comprising the steps of establishing an initial value for a parameter, the sign of the parameter indicating whether less error between the actual position of the object and the desired circular path would result from a simultaneous incremental move by the pair of motors or an incremental move by only one of the motors, checking the sign of the value of the parameter and performing the incremental move which will result in less error. The method further includes the steps of updating a first counting means count total representing the number of incremental moves during which both of the motors moved the object, updating a second counting means count total representing the number of incremental moves for which only one of the motors moved the object, updating the value of the parameter in accordance with the error resulting from the incremental move performed and repeating the checking, performing and updating steps until the object reaches the finishing point. The first counting means count total is initially set equal to the number of incremental moves representing the distance between the starting point and the finishing point along the axis along which the starting point is closer to the center of the arc and the count total is updated by decrementing by one count for each incremental move performed. The second counting means count total is initially set equal to the first counting means initial count total subtracted from the number of incremental moves representing the distance between the starting point and the finishing point along the other axis and the second counting means count total is updated by incrementing it by one count each time only one of the motors performs an incremental move. When an incremental move is performed during which the object moves from the one octant into the adjacent octant, the count total of the second counting means is added to the count total in the first counting means and the sign of the count total in the second counting means is changed. When the count total of the first counting means is zero, a number of incremental moves equal to the count total of the second counting means is performed to position the object at the finishing point.

An apparatus for controlling the movement of an object, such as a machine tool, along a predetermined path defining an arc having a starting point in a first octant and a finishing point in a second octant adjacent the first octant including a pair of motors, such as stepping motors, for moving the object in individual incremental moves along a corresponding pair of orthogonal axes and drive means for actuating each of the motors in response to a control signal and for inhibiting each of the motors in response to a disable signal. The apparatus also includes a source of information signals representing the one of the pair of motors which is to be inhibited for at least one incremental move in the first octant, the distance between the starting point and the center of the arc along the orthogonal axes and the distances between the starting point and the finishing point along the orthogonal axes and a control circuit responsive to the information signals for generating the control and disable signals to control the movement of the object along the path.

The present invention relates to an improvement of the above-defined apparatus comprising means for establishing an initial value of a first parameter (sum of the errors) the sign of which indicates whether less error would result from a simultaneous incremental move by the motors or an incremental move by only one of the motors and for updating the value of the first parameter in response to a signal representing the previous move; means for maintaining a first count total representing the number of incremental moves made during which both of the motors moved the object; means for maintaining a second count total representing the number of incremental moves for which only one of the motors moved the object; and means responsive to the sign of the first parameter for generating the control signal and the disable signal corresponding to the move indicated as resulting in less error. The means for maintaining a first count total includes the pulse counter and the means for maintaining a second count total includes the non-simultaneous counter. The pulse counter is preset to a count total equal to the number of incremental moves representing the distance between the starting point and the finishing point along the axis along which the starting point is closer to the center of the arc which count total is decremented each time an incremental move is made where both of the motors move the object. The non-simultaneous counter is preset to a count total equal to the number of incremental moves representing the distance between the starting point and the finishing point along the axis along which the starting point is closer to the center of the arc minus the number of incremental moves between the starting point and the finishing point along the other axis which count total is decremented each time an incremental move is made where only one of the motors moves the object.

Also included is means for establishing an initial value for a second parameter (simultaneous move error) the sign of which indicates whether the object is in the first octant or the second octant. There are means respective to a change in sign of the second parameter for adding the count total of the non-simultaneous counter to the count total of the pulse counter and for changing the sign of the non-simultaneous counter count total. Furthermore, the means for generating the control signal and the disable signal is responsive to a zero count total in the pulse counter for generating the control signal and the disable signal corresponding to the move required to make the non-simultaneous counter count total equal to zero.

In accordance with the provisions of the patent statutes, the principle and mode of operation of the invention have been explained in its preferred embodiment. However, it must be understood that the invention may be practiced otherwise than as specifically illustrated and described without departing from its spirit or scope.

What is claimed is:

1. A method of controlling a pair of motors for moving an object along a predetermined circular path defining an arc having a starting point in one octant and a finishing point in an adjacent octant, the motors controlling movement of the object in incremental moves along orthogonal axes, comprising the steps of:
   a. establishing an initial value for a parameter, the sign of said parameter indicating whether less error between the actual position of the object and the desired circular path would result from a simultaneous incremental move by the pair of motors or an incremental move by only one of the motors;
   b. checking the sign of the value of said parameter and performing the incremental move which will result in less error;
   c. updating a first counting means count total representing the number of incremental moves for which both of the motors moved the object;
   d. updating a second counting means count total representing the number of incremental moves for which only one of the motors moved the object.
   e. updating the value of said parameter in accordance with the error resulting from the incremental move performed in step b; and
   f. repeating steps b through e until the object reaches the finishing point.

2. A method according to claim 1 wherein said first counting means count total is initially set equal to the number of incremental moves representing the distance between the starting point and the finishing point along the axis along which the starting point is closer to the center of the arc and wherein step c is performed by decrementing said first counting means count total by one count.

3. A method according to claim 2 wherein said second counting means count total is initially set equal to said first counting means initial count total subtracted from the number of incremental moves representing the distance between the starting point and the finishing point along the other axis and wherein step d is performed by incrementing said second counter count total by one count each time only one of the motors performs an incremental move.

4. A method according to claim 3 wherein, when the incremental move is performed during which the object moves from the one octant into the adjacent octant, the count total of said second counting means is added to the count total in said first counting means and the sign of the count total in said second counting means is changed.

5. A method according to claim 4 wherein during incremental moves by only one of the pair of motors in the one octant, the one of the pair of motors corresponding to the axis along which the starting point is farther from the center of the arc is selected to be inhibited and during incremental moves by only one of the pair of motors in the adjacent octant, the other one of the pair of motors is selected to be inhibited.

6. A method according to claim 5 wherein, when the count total of said first counting means is zero, a number of incremental moves equal to the count total of said second counting means is performed to position the object at the finishing point.

7. A method according to claim 1 wherein said parameter is a first parameter; step a includes establishing an initial value for a second parameter, the sign of said second parameter indicating whether the object is in the one octant or the adjacent octant; step e includes updating the value of said second parameter by adding a first predetermined value for a simultaneous incremental move by the pair of motors and adding a second predetermined value for an incremental move by only one of the pair of motors; and, when the sign of said second parameter changes, the count total in said second counting means is added to the count total in said first counting means and the sign of the count total in said second counting means is changed.

8. A method according to claim 1 wherein step e is performed by adding a first predetermined value for each simultaneous incremental move by the pair of motors, a second predetermined value for each incremental move by only one of the pair of motors in the one octant and a third predetermined value for each incremental move by only one of the pair of motors in the other octant.

9. A method of controlling a pair of motors for moving a machine tool along a predetermined path defining an arc having a starting point in one octant and a finishing point in an adjacent octant, the motors controlling movement of the element in increments along orthogonal axes, comprising the steps of:
  a. loading a first counter with a count total equal to the number of incremental moves representing the distance between the starting point and the finishing point along the axis along which the starting point is closer to the center of the arc;
  b. loading a second counter with a count total equal to said first counter count total subtracted from the number of incremental moves representing the distance between the starting point and the finishing point along the other axis;
  c. establishing an initial value of a parameter proportional to the sum of the errors of previous moves, the sign of the value of said sum of the errors parameter indicating whether less error would result from a simultaneous incremental move by the pair of motors or an incremental move by only one of the pair of motors;
  d. checking the sign of the value of said sum of the errors parameter and performing the indicated incremental move;
  e. updating the value of said sum of the errors parameter in accordance with the change in error resulting from the incremental move performed in step d;
  f. decrementing said first counter count total by one count;
  g. incrementing said second counter count total by one count if one of the motors was inhibited during the incremental move in step d;
  h. repeating steps d through g until said first counter count total equals zero; and
  i. performing a move with the motor that could have been inhibited on the previous move, said move being equal to the count total of said second counter.

10. A method according to claim 9 wherein step c includes establishing an initial value for a simultaneous move error parameter proportional to the number of moves of both motors required to reach the point at which the predetermined path leaves the one octant and enters the adjacent octant; step e includes updating the value of said simultaneous move error parameter by adding a first predetermined value for a simultaneous move by the pair of motors and a second predetermined value for an incremental move by only one of the pair of motors; and, when the sign of said simultaneous move error parameter changes, the count total of said second counter is added to the count total of said first counter and the sign of the count total in said second counter is changed.

11. A method according to claim 10 wherein step c includes establishing initial values for a first octant linear move error parameter and an octant change parameter; step e includes updating the value of said first octant linear move error parameter by adding a third predetermined value for each incremental move in the one octant and updating the value of said octant change parameter by a fourth predetermined value for each incremental move by only one of the pair of motors in the one octant; and said updating of said sum of the errors parameter is performed by adding the updated value of said first octant linear move error parameter for each incremental move by only one of the pair of motors in the one octant and by adding the updated value of said simultaneous move error parameter for each simultaneous incremental move by the pair of motors.

12. A method according to claim 11 wherein, when the sign of said simultaneous move error parameter changes, said updating of said sum of the errors parameter is performed by adding the value of said octant change parameter.

13. A method according to claim 12 wherein step c includes establishing an initial value for a second octant linear move error parameter; step e includes updating the value of said second octant linear move error parameter by adding a fifth predetermined value for each incremental move by only one of the pair of motors in the one octant and each incremental move in the adjacent octant; and said updating of said sum of the errors parameter is performed by adding the updated value of said second octant linear move error parameter for each incremental move by only one of the pair of motors in the adjacent octant.

14. In an apparatus for controlling the movement of an object along a predetermined path defining an arc having a starting point in a first octant and a finishing point in a second octant adjacent the first octant including a pair of motors for moving the object in individual incremental moves along a corresponding pair of orthogonal axes; drive means for actuating each of the motors in response to a control signal and for inhibiting each of the motors in response to a disable signal; a source of information signals representing the one of the pair of motors which is to be inhibited for at least one incremental move in the first octant, the distances between the starting point and the center of the arc along the orthogonal axes and the distances between the starting point and the finishing point along the orthogonal axes; and a control circuit responsive to the information signals for generating the control and disable signals to control the movement of the object along the path, the improvement comprising:
  means for establishing an initial value for a first parameter the sign of which indicates whether less error would result from a simultaneous incremental move by the motors or an incremental move by only one of the motors and for updating the value of said first parameter in response to a signal representing the move just made;
  means for maintaining a first count total representing the number of incremental moves made along the axis along which the starting point is closer to the center of the arc;
  means for maintaining a second count total representing the number of incremental moves for which only one of the motors made an incremental move; and
  means responsive to the sign of said first parameter for generating the control signal and the disable signal corresponding to the move indicated as resulting in less error and for generating said signal representing the move just made.

15. An apparatus according to claim 14 wherein said means responsive to the sign of said first parameter includes means for generating a non-simultaneous move signal in response to the generation the disable signal and wherein said means for maintaining a second count total includes a non-simultaneous counter responsive to the generation of said non-simultaneous move signal for updating a count total representing the number of incremental moves for which only one of the motors made an incremental move.

16. An apparatus according to claim 15 wherein said non-simultaneous counter is preset to a count total equal to the number of incremental moves representing the distance between the starting point and the finishing point along the axis along which the starting point is closer to the center of the arc minus the number of incremental moves between the starting point and the finishing point along the other axis and said preset count total is incremented each time said non-simultaneous counter count total is updated.

17. An apparatus according to claim 16 including means for establishing an initial value for a second parameter the sign of which indicates whether the object is in the first octant or the second octant and means responsive to a change in sign of said second parameter for changing the sign of said non-simultaneous counter count total.

18. An apparatus according to claim 17 wherein said means for maintaining a first count total includes a pulse counter responsive to the generation of the control signal for updating a count total representing the number of incremental moves made along the axis along which the starting point is closer to the center of the arc.

19. An apparatus according to claim 18 wherein said pulse counter is preset to a count total equal to the number of incremental moves representing the distance between the starting point and the finishing point along the axis along which the starting point is closer to the center of the arc and said pulse counter preset control total is decremented each time said pulse counter count total is updated.

20. An apparatus according to claim 19 including means responsive to a change in sign of said second parameter for adding the count total of said non-simultaneous counter to the count total of said pulse counter before the sign of said non-simultaneous counter count total is changed.

21. An apparatus according to claim 20 wherein said means for generating the control signal and the disable signal is responsive to a zero count total in said pulse counter for generating the control signal and the disable signal corresponding to the move required to make said non-simultaneous counter count total equal to zero.

22. In an apparatus for controlling the movement of a machine tool along a predetermined path defining an arc having a starting point in a first octant and a finishing point in a second octant including a pair of stepping motors for moving the machine tool in individual incremental moves along a corresponding pair of orthogonal axes; drive means for actuating each of the motors in response to a control signal and for inhibiting each of the motors in response to a disable signal; a source of information signals representing the one of the pair of motors which is to be inhibited for at least one incremental move in the first octant, the distances between the starting point and the center of the arc along the orthogonal axes and the distances between the starting point and the finishing point along the orthogonal axes; and a control circuit responsive to the information signals for generating the control signal and the disable signal to control the movement of the machine tool along the path, the improvement comprising:

means for establishing an initial value for each of five parameters and for updating the value of each of said five parameters in response to a signal representing the move just made; said five parameters including a sum of the errors parameter the sign of which indicates whether less error would result from a simultaneous incremental move by the motors or an incremental move by only one of the motors, a first octant linear move error parameter, a second octant linear move error parameter, an octant change parameter and a simultaneous move error parameter the sign of which indicates whether the machine tool is in the first or the second octant;

a pulse counter preset to a count total equal to the number of incremental moves representing the distance between the starting point and the finishing point along the axis along which the starting point is closer to the center of the arc, said pulse counter being responsive to the generation of the control signal for decrementing said pulse counter count total;

a non-simultaneous counter preset to a count total equal to said pulse counter count total subtracted from the number of incremental moves between the starting point and the finishing point along the other axis, said non-simultaneous counter being responsive to the generation of a non-simultaneous move signal for incrementing said non-simultaneous counter count total; and means responsive to the sign of said sum of the errors parameter for generating the control signal and the disable signal corresponding to the move indicated as resulting in less error for generating said non-simultaneous move signal when the disable signal is generated and for generating said signal representing the move just made.

23. An apparatus according to claim 22 wherein after each incremental move by only one of the motors in the first octant said octant change parameter is updated by adding a first predetermined value, said first octant linear move error parameter and said simultaneous move error parameter are updated by adding a second predetermined value and said sum of the errors parameter is updated by adding the new value of said first octant linear move error parameter; after each incremental move by both of the motors in the first octant said first and second octant linear move error parameters are updated by adding said second predetermined value, said simultaneous move error parameter is updated by adding a third predetermined value and said sum of the errors parameter is updated by adding the new value of said simultaneous move error parameter; after each incremental move by only one of the motors in the second octant said second octant linear move error parameter and said simultaneous move error parameter are updated by adding said second predetermined value and said sum of the errors parameter is updated by adding the new value of said second octant linear move error parameter; and after each incremental move by both of the motors in the second octant said second octant linear move error parameter is updated by adding said second predetermined value, said simultaneous move error parameter is updated by adding said third predetermined value and said sum of the errors parameter is updated by adding the new value of said simultaneous move error parameter.

24. An apparatus according to claim 23 including means responsive to the change in sign of said simultaneous move error parameter for adding the count total of said non-simultaneous counter to the count total of said pulse counter and then changing the sign of the count total of said non-simultaneous counter.

* * * * *